(12) United States Patent
Palakkode et al.

(10) Patent No.: US 12,664,608 B2
(45) Date of Patent: Jun. 23, 2026

(54) DEEP LEARNING BASED CAUSAL IMAGE REPROJECTION FOR TEMPORAL SUPERSAMPLING IN AR/VR SYSTEMS

(71) Applicant: Apple Inc., Cupertino, CA (US)

(72) Inventors: Vinay Palakkode, Santa Clara, CA (US); Kaushik Raghunath, Pleasanton, CA (US); Venu M. Duggineni, San Jose, CA (US); Vivaan Bahl, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 18/472,710

(22) Filed: Sep. 22, 2023

(65) Prior Publication Data

US 2024/0104693 A1 Mar. 28, 2024

Related U.S. Application Data

(60) Provisional application No. 63/477,686, filed on Dec. 29, 2022, provisional application No. 63/376,928, filed on Sep. 23, 2022.

(51) Int. Cl.
| | |
|---|---|
| *G06T 3/4046* | (2024.01) |
| *G06T 7/60* | (2017.01) |
| *G06T 7/70* | (2017.01) |
| *G06T 15/00* | (2011.01) |

(52) U.S. Cl.
CPC .............. *G06T 3/4046* (2013.01); *G06T 7/60* (2013.01); *G06T 7/70* (2017.01); *G06T 15/005* (2013.01); *G06T 2207/20084* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 10,254,544 B1 * | 4/2019 | Melzer ................. | G02B 27/017 |
| 2017/0132839 A1 * | 5/2017 | Ambrus ............ | G02B 27/0172 |
| 2017/0180721 A1 * | 6/2017 | Parker .................. | H04N 13/383 |
| 2019/0043261 A1 * | 2/2019 | Perez-Ramirez ....... | G01S 11/12 |
| 2019/0130639 A1 * | 5/2019 | Boyce ..................... | G06F 3/013 |
| 2020/0167999 A1 * | 5/2020 | Schmit ................... | G06F 3/013 |
| 2021/0064925 A1 * | 3/2021 | Shih ....................... | G06N 3/084 |
| 2021/0090327 A1 * | 3/2021 | Boyce ................ | G06F 18/2413 |
| 2021/0240257 A1 * | 8/2021 | Mironov ................ | G06F 3/012 |
| 2025/0104186 A1 * | 3/2025 | Cohen ................... | G06N 3/044 |

* cited by examiner

*Primary Examiner* — Frank S Chen
(74) *Attorney, Agent, or Firm* — Blank Rome LLP

(57) ABSTRACT

Generating synthesized data includes capturing one or more frames of a scene at a first frame rate by one or more cameras of a wearable device, determining body position parameters for the frames, and obtaining geometry data for the scene in accordance with the one or more frames. The frames, body position parameters, and geometry data are applied to a trained network which predicts one or more additional frames. With respect to virtual data, generating a synthesized frame includes determining current body position parameters in accordance with the one or more frames, predicting a future gaze position based on the current body position parameters, and rendering, at a first resolution, a gaze region of a frame in accordance with the future gaze position. A peripheral region is predicted for the frame at a second resolution, and the combined regions form a frame that is used to drive a display.

17 Claims, 8 Drawing Sheets

CONTENT
105
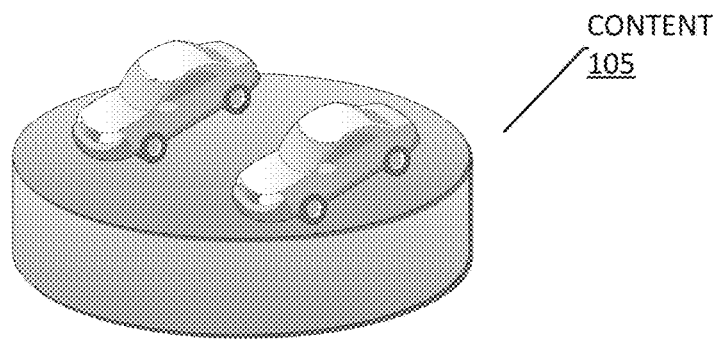
LOW
RESOLUTION
GPU RENDERING
120
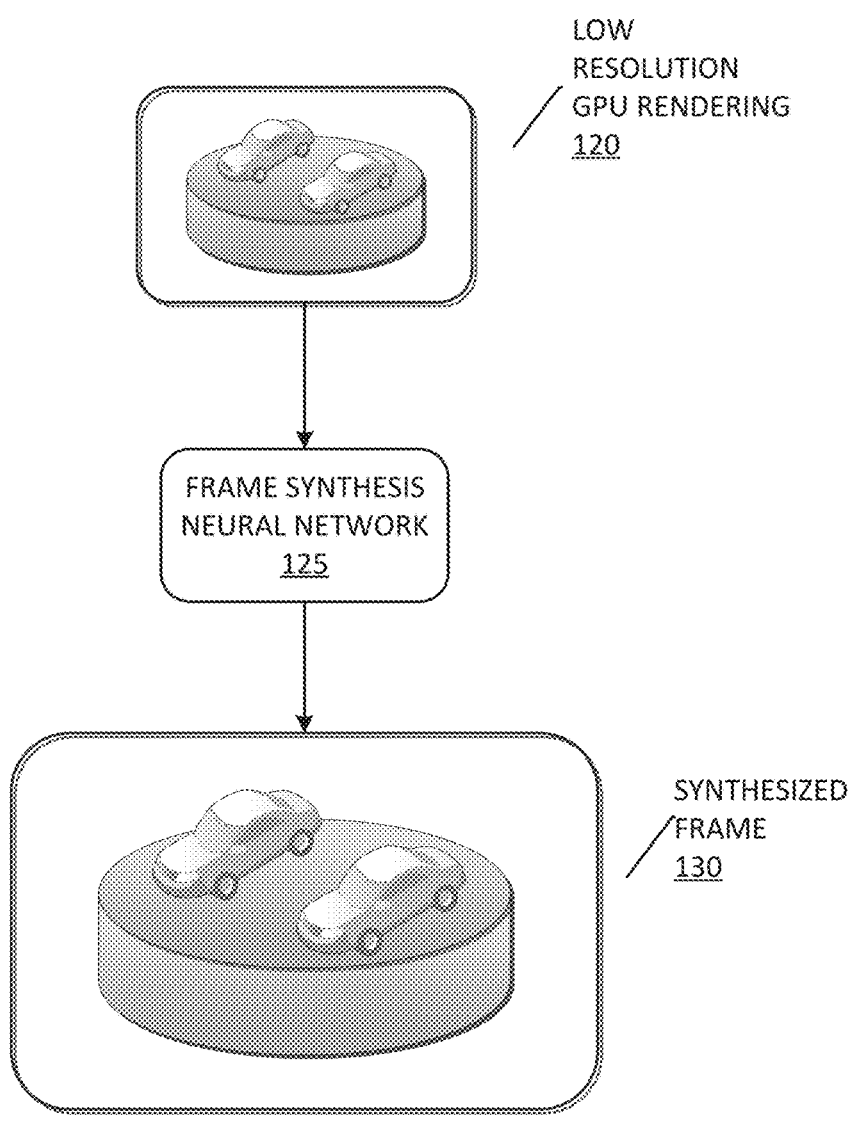
FRAME SYNTHESIS
NEURAL NETWORK
125
SYNTHESIZED
FRAME
130
*FIG. 1*

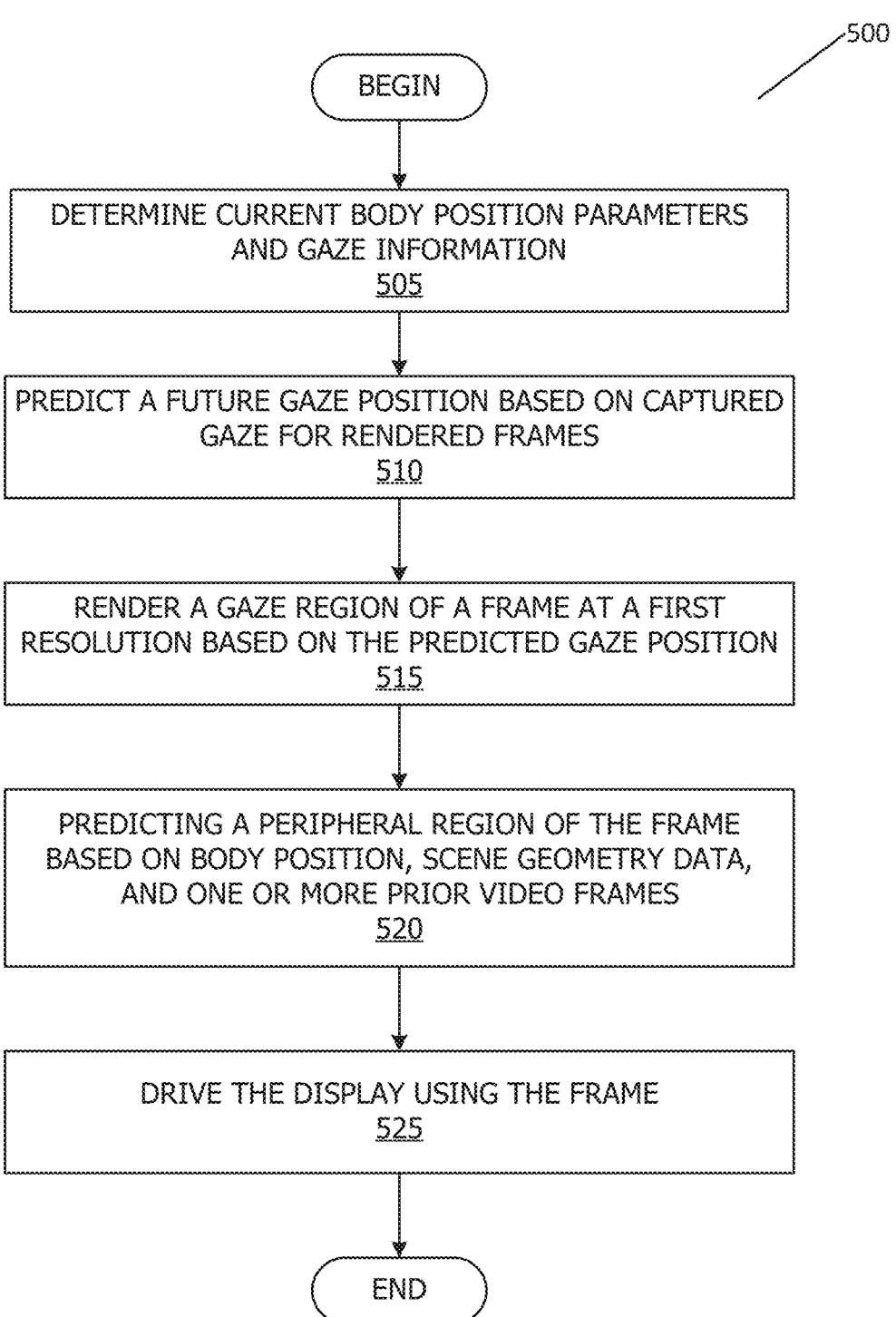

500

BEGIN

DETERMINE CURRENT BODY POSITION PARAMETERS
AND GAZE INFORMATION
505

PREDICT A FUTURE GAZE POSITION BASED ON CAPTURED
GAZE FOR RENDERED FRAMES
510

RENDER A GAZE REGION OF A FRAME AT A FIRST
RESOLUTION BASED ON THE PREDICTED GAZE POSITION
515

PREDICTING A PERIPHERAL REGION OF THE FRAME
BASED ON BODY POSITION, SCENE GEOMETRY DATA,
AND ONE OR MORE PRIOR VIDEO FRAMES
520

DRIVE THE DISPLAY USING THE FRAME
525

END

*FIG. 5*

DEEP LEARNING BASED CAUSAL IMAGE REPROJECTION FOR TEMPORAL SUPERSAMPLING IN AR/VR SYSTEMS

FIELD OF THE INVENTION

This disclosure relates generally to image processing. More particularly, but not by way of limitation, this disclosure relates to techniques and systems for predicting image data to generate synthesized scaled, reprojected frames.

BACKGROUND

Extended reality environments allow users to interact with virtual objects and applications within a view of a physical environment. When it comes to content rendering an AR/VR and multimedia systems, a significant amount of power can be consumed due to computational complexities and large amounts of data movement. Accordingly, a technique is needed to improve computational efficiency of rendered image data in the extended reality and multimedia systems.

BRIEF DESCRIPTION OF THE DRAWINGS

FIG. 1 shows a diagram for generating upscaled synthesized frames, according to one or more embodiments.

FIG. 5 shows, in flowchart form, an example process for supersampling and reprojecting extended reality content, in accordance with one or more embodiments.

DETAILED DESCRIPTION

Figure 2:
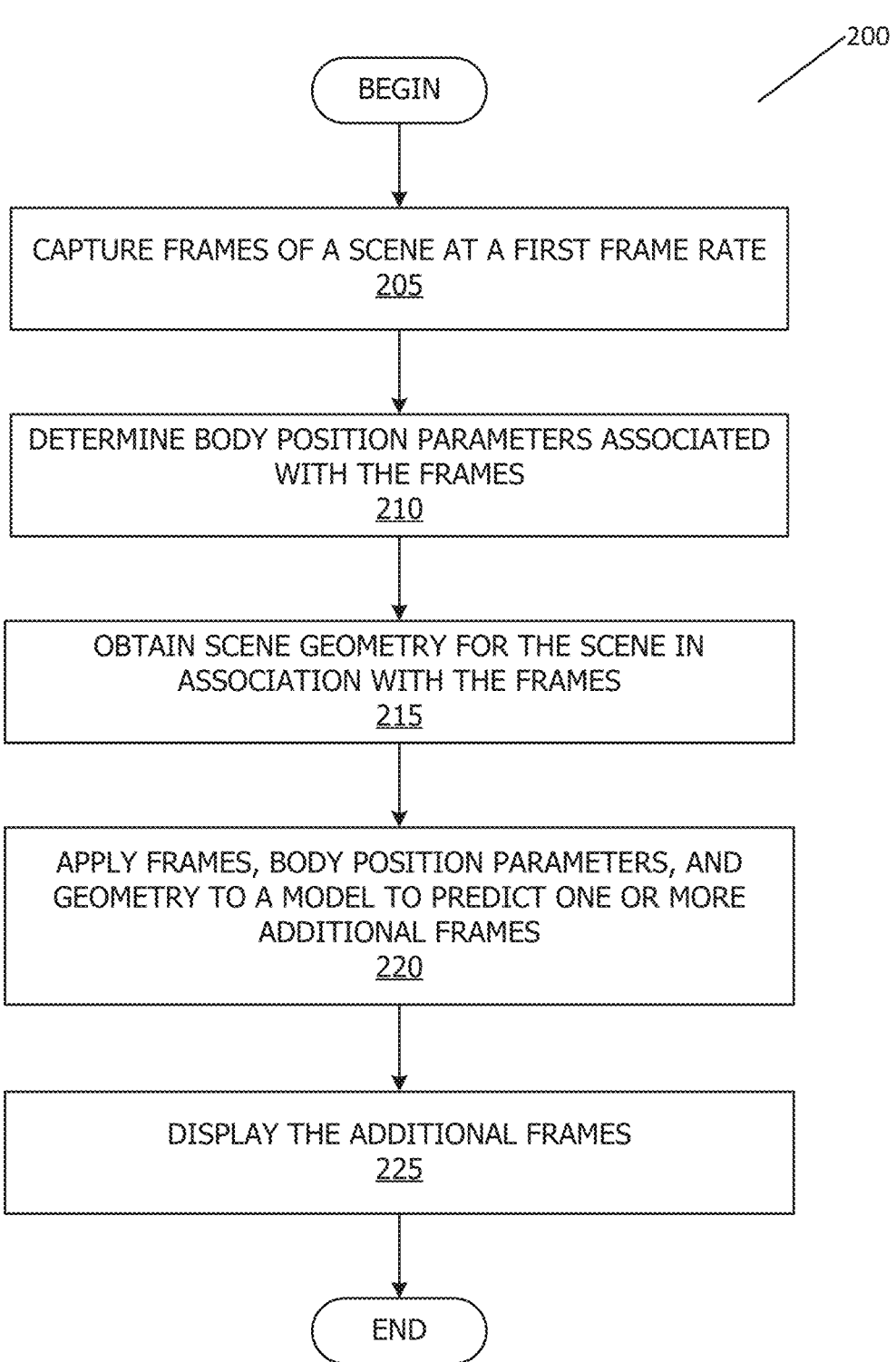
FIG. 2 shows a flowchart of a technique for generating synthesized reprojected frames, according to one or more embodiments.

Embodiments described herein relate to a technique for generating synthesized images to provide spatial and temporal supersampling. In addition, embodiments described herein are directed to a technique for generating synthesized images in which the field-of-view is reprojected.

More specifically, techniques described herein are related to content rendering and AR/VR and multimedia systems by utilizing causal temporal supersampling the video frames using deep learning. According to some embodiments, image frames may be captured of the scene at a first frame rate. A system may obtain signals related to upsampling and reprojection in order to synthesize future frames related to the captured image frames. This may include, for example, pose data, gaze data, depth data, geometry data and the like, or some combination thereof. The input signals and the captured image frames may be applied to a trained network which is configured to generate synthesized frames based on a predicted updated field-of-view, and at a resolution which may differ from the resolution of the image frames as captured. The trained network may be configured to consider temporal data, for example in the form of a series of frames used as input. Time series samples may be obtained from each input signal to allow the network to predict one frame, or a series of future frames, based on given input data. Further, in some embodiments, the obtain frames may be rendered at a low frame rate and/or resolution. The network may be capable of generating the synthesized frames at an upsampled target resolution, for example, because some of the input signals may be received at a higher target frame rate and/or resolution. Accordingly, a graphics processor may render a set of frames at a low frame rate, and additional frames, or intermediate frames, may be generated at a higher frame rate or resolution, for example by a neural engine or other component configured to execute a trained model. Accordingly, techniques described herein solve the technical problem of producing high resolution video frames, or frames at a high frame rate on power constrained devices.

Embodiments described herein additionally reduce power consumption when rendering high resolution images. In some systems, the energy required to render high resolution images using traditional compute nodes, such as a GPU, is proportional to the complexity of the scene or geometry being rendered. By contrast, the energy required to upsample from a low-resolution image to a high resolution image via a trained neural network can be fixed or generally a stable amount in accordance with embodiments described herein. As such, the techniques described below provides power savings by relying on upsampling rather than traditional rendering under certain scenarios, such as a predetermined complexity of a scene and/or power restrictions of a device.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood, however, that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes and may not have been selected to delineate or circumscribe the inventive subject matter, it being necessary to resort to the claims in order to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not necessarily be understood as all referring to the same embodiment.

It will be appreciated that, in the development of any actual implementation (as in any software and/or hardware development project), numerous decisions must be made to achieve a developer's specific goals (e.g., compliance with system- and business-related constraints) and that these goals may vary from one implementation to another. It will also be appreciated that such development efforts might be complex and time consuming but would nevertheless be a routine undertaking for those of ordinary skill in the design and implementation of multi-modal processing systems having the benefit of this disclosure.

Various examples of electronic systems and techniques for using such systems in relation to various technologies are described.

A physical environment, as used herein, refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust the characteristic(s) of graphical content in the XR environment in response to representations of physical motions (e.g., vocal commands).

There are many different types of electronic systems that enable a person to sense and/or interact with various XR environments. Examples include: head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Turning to FIG. 1, an example diagram is presented, in accordance with one or more embodiments. Embodiments described herein are related to a technique for reducing power requirements in rendering and presenting image frames by using the graphics processing unit to render frames a low-power mode. In some embodiments, a graphical processing unit (GPU) may initially render one or more frames at a low resolution, for example from a camera feed. A machine learning model is then used to upsample additional frames at a target resolution. Thus, FIG. 1 depicts an example content 105, which may be captured by one or more cameras for presentation. Accordingly, at 120, a graphical processing unit (GPU) renders a low-resolution frame corresponding to the content. The GPU may be part of the system generating image data for a pass-through display. Accordingly, if a device captures camera feed of the content 105, then the system initially generates a low-resolution version of the frame.

According to one or more embodiments, a trained network may be provided to generate synthesized image frames, such as video frames, and virtual of sample and/or reproject the image data rendered at low-resolution GPU rendering 120. In some embodiments, frame synthesis neural network 125 receives, as input signals, one or more image frames, body position parameters associated with the image frames, and/or geometry data for the scene in accordance with the image frames. Body position parameters may include, for example, pose information (e.g., head pose and/or body pose data). In some embodiments, the body position parameters may include additional data, such as motion data, depth data, or other characteristics of the subject of the pose data which may be used for predicting a future pose of the user for a synthesized frame. In some embodiments, the pose data may include data related to the position and orientation of the tracked subject, for example as represented in the form of 6 degrees of freedom. Other characteristics may be obtained, for example, from visual inertial odometry (VIO) tracking, and/or simultaneous localization mapping (SLAM) tracking techniques. For example, these localization techniques may be concurrently running on the device generating the synthesized frames. As such, the frame synthesis neural network 125 may be trained to consider such localization information when generate synthesized frames. In addition to pose information, body position parameters may also include gaze information. Gaze information may include, for example, gaze vector information, pupil location, or the like. Gaze information may be obtained from a gaze tracking pipeline, and may include data collected from gaze tracking sensors, such as cameras facing a user's eye, or other such sensors.

The input signals may include, for example, data related to the scene, such as geometry information. For purposes described herein, geometry information may be related to a geometric representation of physical objects in the scene, the geometric representation of virtual objects in the scene, texture information in the scene, and the like. As an example, the geometric representation may be provided in the form of a 3D mesh representation. The texture information may be related to a physical appearance of an overlay on the geometry, and may be related to a material of the object, a reflectivity of the object, or other characteristics related to the visual appearance of the object. Further, the texture information may be related to physical and/or virtual objects in the scene. In some embodiments, the geometry information may additionally include depth information in the scene. Depth information may indicate how far away from the camera various objects in the scene are located. Depth information may be provided for both virtual objects and physical objects in the scene. For example, the depth of physical objects may be determined from the depth sensor, depth camera, stereo camera, or the like on the electronic device. Depth information for a virtual object may be provided as a characteristic or metadata of the virtual object in the scene. The depth of a virtual object may be predefined by the system, and application, or a user. Moreover, in some embodiments, the depth of the virtual object may be user-defined, and in some embodiments a user can dynamically change the depth of the virtual object in the scene.

According to some embodiments, the frame synthesis neural network 125 utilizes the various input signals, or some combination thereof, to generate synthesized data. The synthesized data may be of sampled from the rendered data at 120 in order to satisfy a target threshold of the frame synthesis neural network 125. In some embodiments, the frame synthesis neural network 125 may be configured to perform spatial supersampling, as well as temporal supersampling. Spatial supersampling occurs when the frame synthesis neural network 125 generates a synthesized frame at a higher resolution than the input frames (such as low-resolution GPU rendering 120). In addition, temporal supersampling may occur when the input frames are provided at a first frame rate, and the synthesized frames are generated at a second frame rate. Moreover, in some embodiments, the frame synthesis neural network 125 can be configured to determine intermediate frames between two frames provided as an input signal. As such, FIG. one depicts the synthesized frame 130.

Although not depicted, it should be understood that the frame synthesis neural network 125 may additionally be configured to re-target the frames. That is, additional unseen frames may be synthesized to depict content yet unseen by the user. Based on the input signals related to body position parameters, a future viewing frustum may be predicted. As such, the future frames may be synthesized to conform to the predicted frustum. The prediction may be based on historic recent movement and pose of a user, and known constraints of the user's movement, for example in the form of inverse kinematics (IK) data. In some embodiments, characteristics of the environment and/or content in the environment may also be considered for predicting a viewing frustum.

FIG. 2 shows, in flowchart form, an example technique for applying a rendering technique to an obstructed portion of a virtual object, in accordance with embodiments described herein. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 200 begins at block 205, where frames of the scene are captured in a first frame rate. According to one or more embodiments, the frames of a scene may be captured by one or more cameras of an electronic device. In some embodiments, the cameras may be comprised in a wearable device donned by a user. As described above, in some embodiments, frames may be captured of the scene at a low frame rate, or at least rendered at a low frame rate, to conserve power resources of the GPU. Subsequently, a machine learning network may be utilized to generate synthesized frames according to a target frame rate and resolution. The frames of the scene may be captured by one or more cameras of an electronic device. For example, in some embodiments, the frames of the scene may be captured by a stereoscopic or other multi-camera system. As such, in some embodiments, the frames of the scene may include a left frame and a right frame, or may otherwise include multiple frames for a particular capture time. For example, the electronic device may be configured such that the camera is capturing the frames may be synchronized in order to ensure that the content of the frames are captured concurrently.

The flowchart 200 continues at block 210, where body position parameters are determined in association with the one or more frames. As described above, body position parameters may include, for example, pose information (e.g., head pose and/or body pose data). In some embodiments, the body position parameters may include additional data, such as motion data, depth data, or other characteristics of the subject of the pose data which may be used for predicting a future pose of the user for a synthesized frame. In some embodiments, the pose data may include data related to the position and orientation of the tracked subject, for example as represented in the form of 6 degrees of freedom. Other characteristics may be obtained, for example, from visual inertial odometry (VIO) tracking, and/or simultaneous localization mapping (SLAM) tracking techniques. In addition to pose information, body position parameters may also include gaze information. Gaze information may include, for example, gaze vector information, pupil location, or the like. Gaze information may be obtained from a gaze tracking pipeline, and may include data collected from gaze tracking sensors, such as cameras facing a user's eye, or other such sensors. According to one or more embodiments, the pose information, motion data, depth data, and other data used to determine the body position parameters may be obtained by or derived from sensor data on one or more electronic devices. In some embodiments, a wearable device donned by a user may include sensors which capture the sensor data from which the body position parameters are determined, where the body position parameters correspond to the body position of the user.

At block 215, the flowchart 200 includes obtaining scene geometry for the seed in association with the frames. As described above, geometry information may be related to a geometric representation of physical objects in the scene, the geometric representation of virtual objects in the scene, texture information in the scene, and the like. As an example, the geometric representation may be provided in the form of a 3D mesh representation. The texture information may be related to a physical appearance of an overlay on the geometry, and may be related to a material of the object, a reflectivity of the object, or other characteristics related to the visual appearance of the object. Further, the texture information may be related to physical and/or virtual objects in the scene. In some embodiments, the geometry information may additionally include depth information in the scene. Depth information may indicate how far away from the camera various objects in the scene are located. Depth information may be provided for both virtual objects and physical objects in the scene. For example, the depth of physical objects may be determined from the depth sensor, depth camera, stereo camera, or the like on the electronic device. Depth information for a virtual object may be provided as a characteristic or metadata of the virtual object in the scene.

The flowchart continues at block 220, where the system applies the captured frames, the body position parameters, and the geometry to a model to predict one or more additional frames. For example, a trained network, such as the frames and positional network 125 of FIG. 1, may utilize the input signals to generate a synthesized frames or set of frames. Because of the nature of the input signals (for example the high rate of capture of the pose data, gaze data, and the like), the trained network may upsample each of the set of frames to a target resolution, and may generate synthesized frames at the target resolution. In some embodiments, the network may be associated with a particular target resolution and/or frame rate. As such, the device may utilize a particular network for a particular target resolution in accordance with some embodiments. According to one or more embodiments, the one or more additional frames may include composite frames, where the model predicts virtual components and composites the predicted virtual components with a passthrough camera image or feed to obtain predicted composite images.

Moreover, in some embodiments, the trained network may not only provide synthesized upsampled frames, but may additionally generate the synthesized frames to be reprojected to a new or additional viewing frustum based on the input signals. As such, the synthesized frames are not merely more versions of captured frames, or interpolated frames, but rather are only generated for a predicted view and for predicted content. In addition, although not depicted, the frame may include image data as well as audio data. For example, the final rendered frame may include the rendered image data along with an audio channel. In some embodiments, this audio channel may be in the form of spatial audio. As such, the model may be further trained to predict the presentation of the spatial audio based on the content of the frame and/or an updated viewing frustum for the frame. That is, the audio may be predicted by the network and, in the case of spatial audio an apparent origin location of the sound for a given frame may also be predicted. Moreover, with respect to intermediate frames, the audio channel may be additionally generated in a synthesized version along with the image data for the frame.

The flowchart 200 concludes at block 225, where the additional frames are displayed. This additional frames are synthesized frames generated by the trained model. In some embodiments, these additional frames may be used to drive the display of a device. As described above, the additional frames may be intermediate frames and/or future frames with respect to the input frames received at block 205.

Figure 3A:
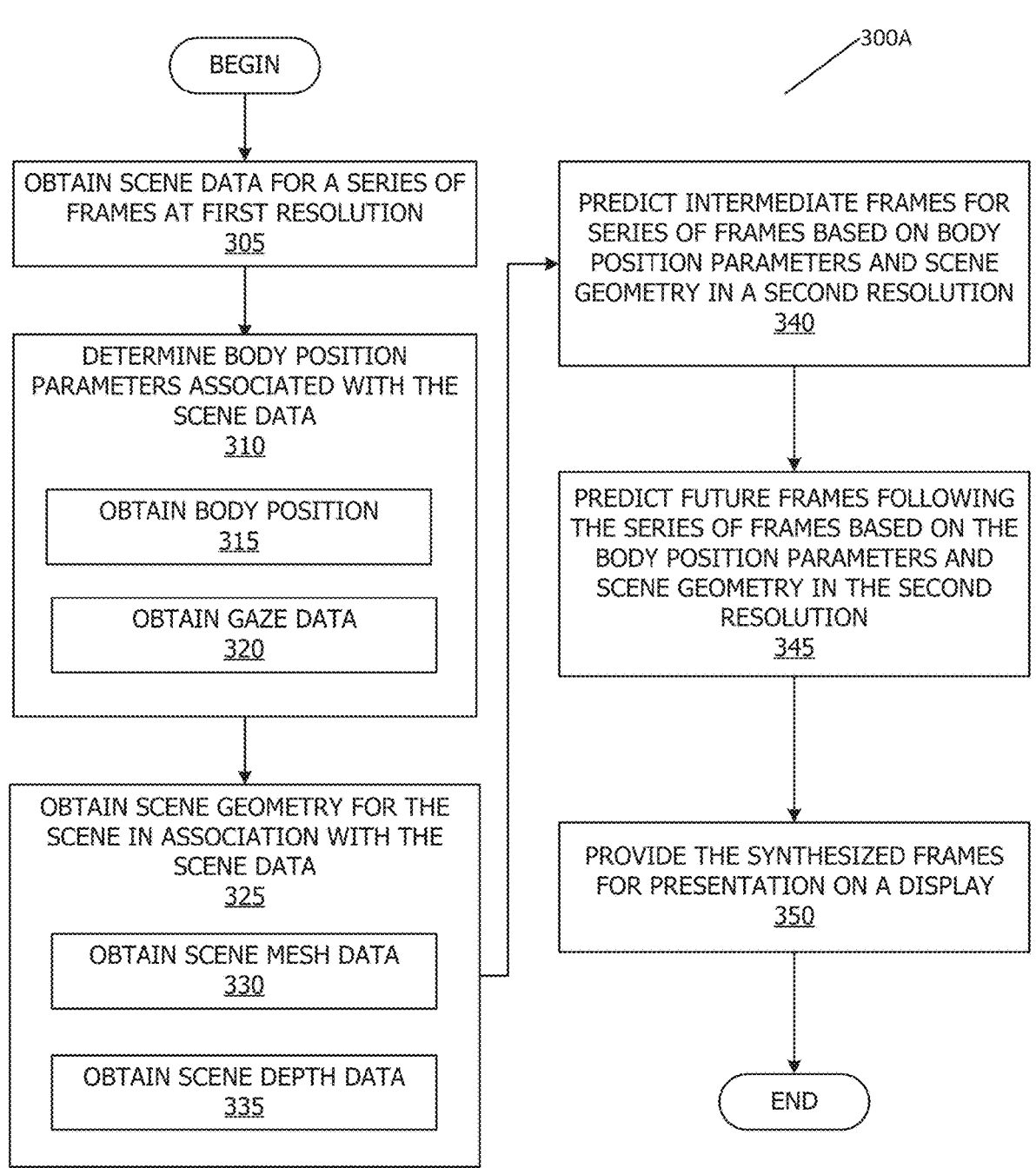
FIG. 3A shows, in flowchart form, an example process for temporally super sampling image frames, in accordance with one or more embodiments.

FIG. 3A shows, in flowchart form, an example process for temporally super sampling image frames, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 300A begins at block 305 where scene data is obtained for a series of frames at a first resolution. The scene data may include, for example, image data captured by one or more cameras of an electronic device, such as pass-through data. Additionally, or alternatively, the scene data may include virtual data to be presented in the scene, such as in an XR environment.

The flowchart 300A continues at block 310, where body position parameters are determined in association with the scene data. For example, in some embodiments, the body position parameters may include body position data captured concurrently with the scene data. Alternatively, current body position parameters may be determined.

As described above, body position parameters may include, for example, pose information (e.g., head pose and/or body pose data). In some embodiments, the body position parameters may include additional data, such as motion data, depth data, or other characteristics of the subject of the pose data which may be used for predicting a future pose of the user for a synthesized frame, for example in the form of body tracking data, as shown at block 315. In some embodiments, the pose data may include data related to the position and orientation of the tracked subject, for example as represented in the form of 6 degrees of freedom. Other characteristics may be obtained, for example, from visual inertial odometry (VIO) tracking, and/or simultaneous localization mapping (SLAM) tracking techniques.

In addition to pose information, body position parameters may also include gaze information, as shown at block 320. Gaze information may include, for example, gaze vector information, pupil location, or the like. Gaze information may be obtained from a gaze tracking pipeline, and may include data collected from gaze tracking sensors, such as cameras facing a user's eye, or other such sensors.

The flowchart 300A continues at block 325 where scene geometry is obtained for the scene in association with the scene data. The scene data may include data related to a geometric representation of physical objects in the scene, the geometric representation of virtual objects in the scene, texture information in the scene, and the like. As an example, the geometric representation may be provided in the form of a 3D mesh representation, as shown at block 330. The texture information may be related to a physical appearance of an overlay on the geometry, and may be related to a material of the object, a reflectivity of the object, or other characteristics related to the visual appearance of the object. Further, the texture information may be related to physical and/or virtual objects in the scene.

In some embodiments, the geometry information may additionally include depth information in the scene, as shown at block 335. Depth information may indicate how far away from the camera various objects in the scene are located. Depth information may be provided for both virtual objects and physical objects in the scene. For example, the depth of physical objects may be determined from the depth sensor, depth camera, stereo camera, or the like on the electronic device. Depth information for a virtual object may be provided as a characteristic or metadata of the virtual object in the scene. The depth of a virtual object may be predefined by the system, and application, or a user. Moreover, in some embodiments, the depth of the virtual object may be user defined, and in some embodiments a user can dynamically change the depth of the virtual object in the scene.

The flowchart 300A continues at block 340, where intermediate frames are predicted for the series of frames based on the body position parameters in the scene geometry. The intermediate frames may be generated at a second resolution, different than the first resolution. For example, these synthesized frames may be generated in a higher resolution than the frames rendered by a GPU. The intermediate frames may be synthesized frames generated such that the full set of frames would thereby be associated with a different frame rate than the initial frame rate. Although not shown, the synthesized frames may be generated from a same or different viewpoint as the initial data. The viewpoint may be predicted by the trained network, for example, based on the determined body position parameters described above with respect to block 310.

At block 345, future frames are predicted which follow the series of frames. The future frames may be synthesized frames generated by the trained network based on the body position parameters and/or scene geometry. Further, the future frames may be generated in the second, higher resolution than the first resolution. Similarly to the intermediary frames described above, the synthesized frames may be generated from the same viewpoint or a different viewpoint as the initial data. That viewpoint may be predicted by the network based on the body position parameters, for example. In some embodiments, the viewpoint may be predicted by a separate network then the network configured to generate the synthetic frames. As such, a first network may predict a future viewpoint, whereas a second network may generate the synthesized frames based on that viewpoint.

The flowchart concludes at block 350, where the synthesized frames are provided for presentation on a display. That is, the synthesized frames may be configured to drive display such that the frames are presented to the user associated with the body position parameters. In some embodiments, the technique described within FIG. 3 may be a continuous method as seen data and frames are provided. In some embodiments, the synthesized frames may be displayed while a next one or more synthesized frames are being generated by the same technique.

Figure 3B:
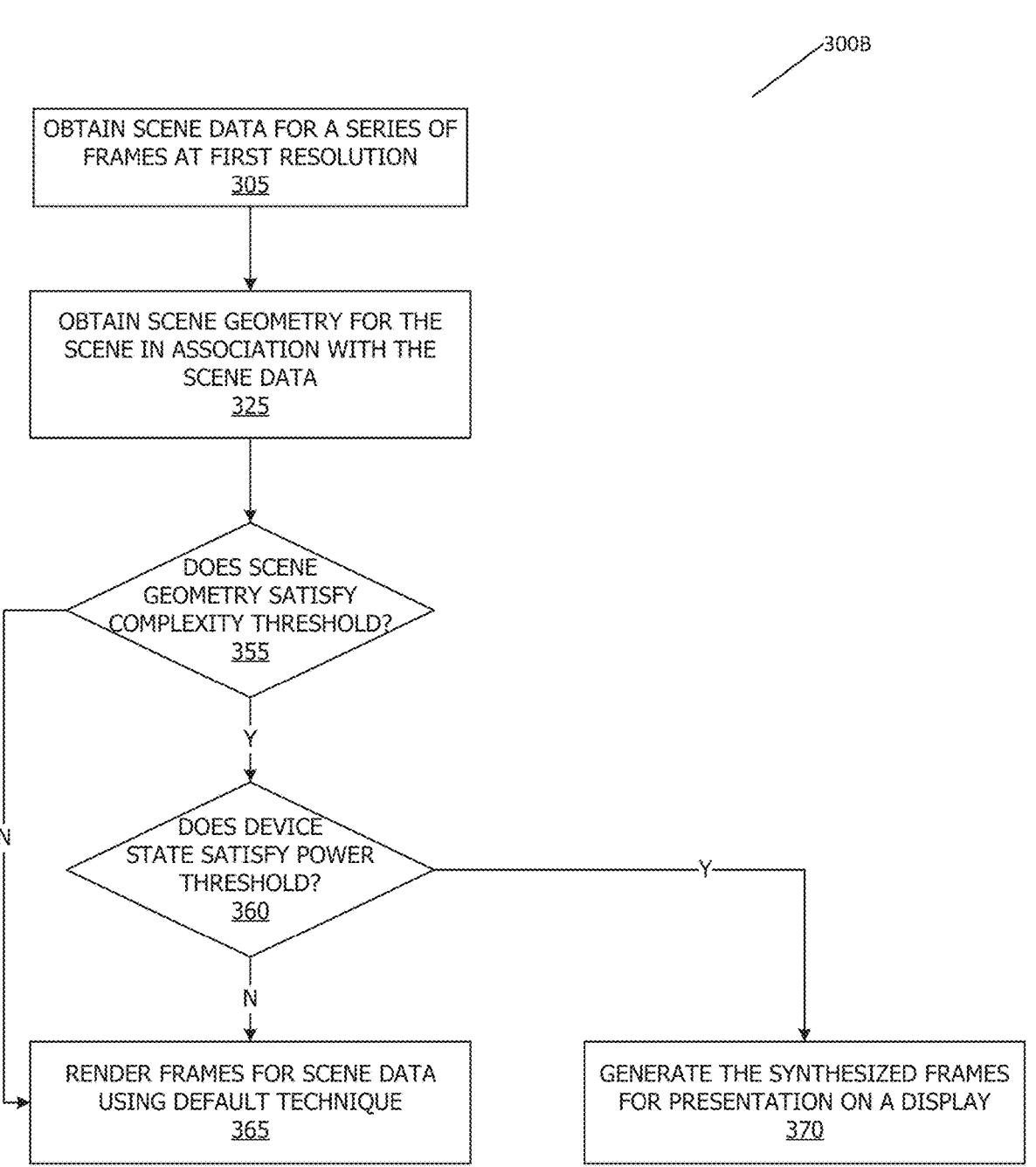
FIG. 3B shows, in flowchart form, an example process for selectively supersampling image frames, in accordance with one or more embodiments.

According to some embodiments, the technique described above with respect to FIG. 3A to generate synthesized frames can be used as a power savings technique. As such, in some embodiments, the technique can be used selectively based on image content, device state, or the like. FIG. 3B shows a flowchart of an example technique for selectively generating synthesized frames in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added, according to various embodiments.

The flowchart 300B includes some of the same steps described above with respect to flowchart 300A of FIG. 3A. For example, at block 305 where scene data is obtained for a series of frames at a first resolution. The scene data may include, for example, image data captured by one or more cameras of an electronic device, such as pass-through data. Additionally, or alternatively, the scene data may include virtual data to be presented in the scene, such as in an XR environment. Then at block 325, scene geometry is obtained for the scene in association with the scene data. The scene data may include data related to a geometric representation of physical objects in the scene, the geometric representation of virtual objects in the scene, texture information in the scene, and the like.

The flowchart 300B continues at block 355, where a determination is made regarding whether the scene geometry satisfies a complexity threshold. According to one or more embodiments, the energy required to render high resolution images using traditional compute nodes, such as a GPU, is proportional to the complexity of the scene or geometry being rendered. By contrast, the use of a network to generate synthesized frames may be associated with a fixed amount of energy independent of scene complexity. As such, a determination as to level of complexity can be determined, for example based on scene geometry obtained at block 325 or other indicators in the scene data. If the characteristics of the scene data does not satisfy a complexity threshold, then the flowchart may proceed to block 365 and frames are rendered using a default technique. The default technique may include, for example, using a CPU, GPU, or the like to render the scene data.

Returning to block 355, if a determination is made that the scene geometry does satisfy the complexity threshold, then the flowchart continues at block 360 and a determination is made regarding whether the device state satisfies a power threshold. In some embodiments, the determination may include determining a current availably of power by the device, maximum power settings for the device, power restrictions for the device, thermal throttling, or the like. In some embodiments, the power threshold may be determined independent of the scene data, or may be dynamically determined based on the complexity level of the scene data. That is, a power threshold may be more likely to be satisfied if the scene geometry is highly complex. If at block 360, a determination is made that the device state satisfies the power threshold, then the flowchart may proceed to block 370 and synthesized frames are generated. In some embodiments, the synthesized frames are generated in accordance with the techniques described above with respect to FIG. 3A.

If the device does not satisfy the power threshold at block 360, then the flowchart 300B concludes at block 365 and frame are rendered using a default technique. The default technique may include, for example, using a CPU, GPU, or the like to render the scene data.

It should be understood that the flowchart 300B includes scene geometry and device state as example power consumption parameters for determining whether to generate synthetic frames, and different power consumption parameters or combinations of power consumption parameters may be employed to determine whether to generate synthesized frames rather than render frames using traditional techniques. For example, other compute resources may be considered, device settings, or other characteristics of the scene data may be used. Moreover, scene geometry and device state may be considered individually of each other and, thus, the flowchart may not require both considerations at blocks 355 and 360 in accordance with some embodiments.

Figure 4:
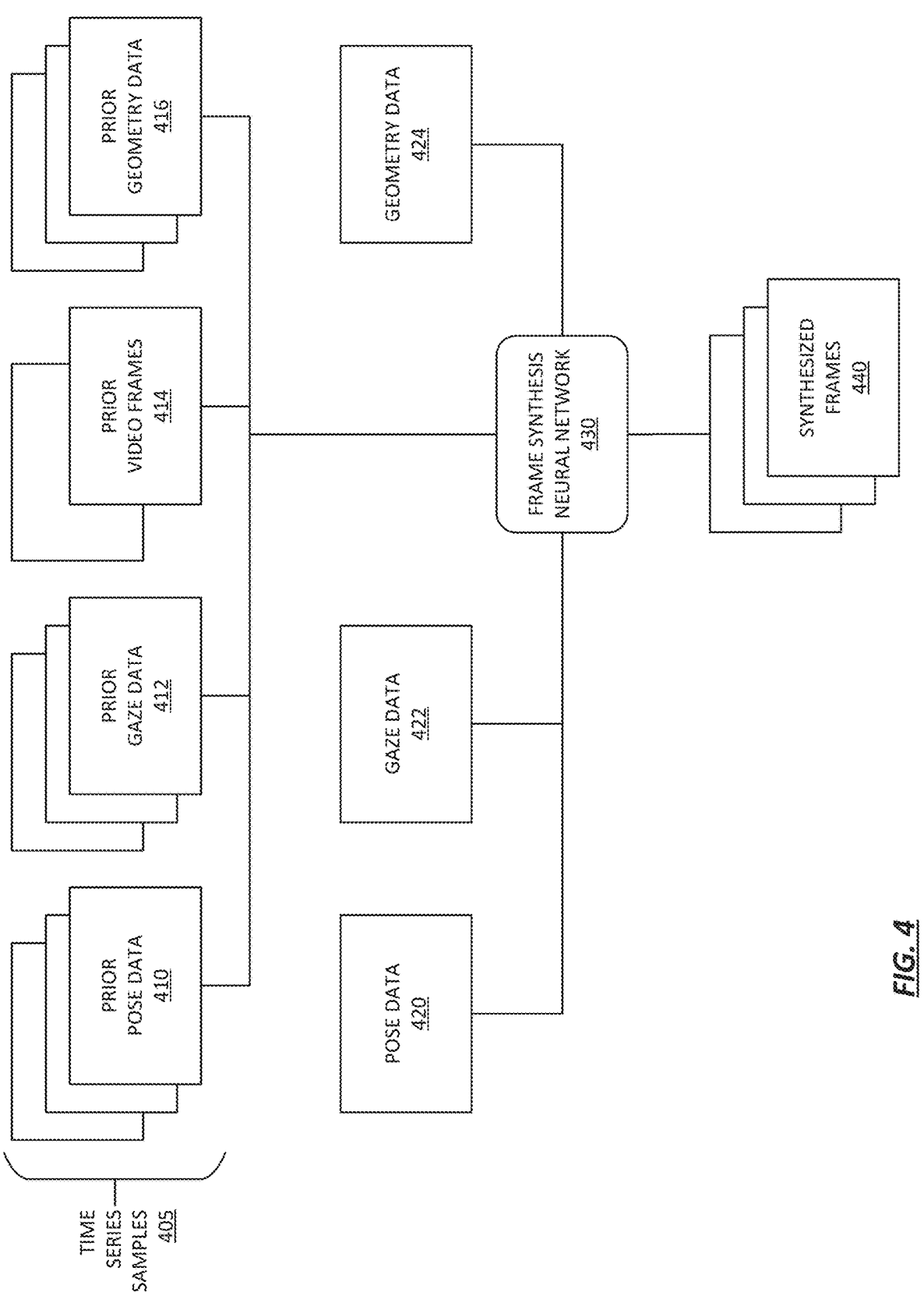
FIG. 4 shows a flow diagram of a method of generating synthesized image frames, in accordance with one or more embodiments.

FIG. 4 shows a flow diagram of a method of generating synthesized image frames, in accordance with one or more embodiments. In particular, because the network may be configured to provide spatial supersampling, as well as temporal supersampling, a variety of sets of input signals are collected. FIG. 4 provides an example flow of those input signals.

The flow diagram begins with a set of time series samples 405. The time series samples include input signals for the trained neural network which are related to a given time period. As such, the time series samples provided include prior pose data 410, prior gaze data 412, prior video frames

414, and prior geometry data 416. As described above, the prior pose data 410 may include head pose and/or body pose data, or the like. In particular, this pose data may be associated with previously rendered frames, such as prior video frames 414. That is, the prior pose data 410 may be collected such that the postdated corresponds to a same time as the video frames 414 were captured. In some embodiments, the body position parameters may include additional data, such as motion data, depth data, or other characteristics of the subject of the pose data which may be used for predicting a future pose of the user for a synthesized frame. In some embodiments, the pose data may include data related to the position and orientation of the tracked subject, for example as represented in the form of 6 degrees of freedom. Other characteristics may be obtained, for example, from visual inertial odometry (VIO) tracking, and/or simultaneous localization mapping (SLAM) tracking techniques. For example, these localization techniques may be concurrently running on the device generating the synthesized frames.

Gaze data 412 may include gaze tracking data and other associated data captured at a time corresponding to the capture of prior video frames 414. Gaze information may include, for example, gaze vector information, pupil location, or the like. Gaze information may be obtained from a gaze tracking pipeline, and may include data collected from gaze tracking sensors, such as cameras facing a user's eye, or other such sensors.

Prior video frames 414 may include one or more video frames captured concurrently, and/or in a series. For example, in some embodiments, the video frames 414 may include stereoscopic image data such that, for each point in time video frames are provided, a left frame and a right frame are provided. Further, in some embodiments, the video frames may be captured at one or more points in time corresponding to the same or similar points in time corresponding to the time series samples 405.

Prior geometry data 416 may include a geometric representation of physical objects in the scene, the geometric representation of virtual objects in the scene, texture information in the scene, and the like. As an example, the geometric representation may be provided in the form of a 3D mesh representation. The texture information may be related to a physical appearance of an overlay on the geometry, and may be related to a material of the object, a reflectivity of the object, or other characteristics related to the visual appearance of the object. Further, the texture information may be related to physical and/or virtual objects in the scene. In some embodiments, the geometry information may additionally include depth information in the scene. Depth information may indicate how far away from the camera various objects in the scene are located. Depth information may be provided for both virtual objects and physical objects in the scene. For example, the depth of physical objects may be determined from the depth sensor, depth camera, stereo camera, or the like on the electronic device. Depth information for a virtual object may be provided as a characteristic or metadata of the virtual object in the scene. The depth of a virtual object may be predefined by the system, and application, or a user. Moreover, in some embodiments, the depth of the virtual object may be user defined, and in some embodiments a user can dynamically change the depth of the virtual object in the scene.

According to some embodiments, the time series samples 405 are used as input into a frame synthesis neural network 430 it should be understood that the various time series samples 405 may be collected at different rates. For example, the video frame rate at which the prior video frames 414 are collected may be less frequent than the rate at which the pose data 410 or the gaze data 412 are collected. Accordingly, the frame synthesis neural network 430 may be configured to handle time series samples 405 which are not perfectly aligned.

The frame synthesis neural network 430 may additionally use as input current data. As such, current pose data 420, current gaze data 422, and current geometry data 424 may additionally be used as input signals into the frame synthesis neural network 430. According to one or more embodiments, the frame synthesis neural network 430 may be trained to generate synthesized frames 440 based on the input signals described above, or some subset thereof. In some embodiments, the frame synthesis neural network 430 may be configured to generate the synthesized frames 440 at a target resolution. In some embodiments, the target resolution may be different than the resolution of the prior video frames 414, or any other resolution of the data used from the input signals. The frame synthesis neural network 430 may further be trained to predict a gaze direction of the user, and may generate the synthesized frames 440 in accordance with the predicted gaze generation. However, in some embodiments, the prediction of the gaze direction may be handled by a separate network. Upon generating the synthesized frames 440, the synthesized frames 440 may be used to drive a display such that they are presented to a user.

In one or more embodiments, the frame synthesis neural network 430 may be trained to generate synthesized frames based on time series sample data and current data based on sets of rendered frames. For example, a set of frames may be rendered, and contextual information for the frames may be obtained, such as, for each frame, pose data, gaze data, and/or geometry data. A subset of the rendered frames may fed into the frame synthesis network 430 during a training stage, along with the pose data, gaze data, and geometry data. The frame synthesis neural network 430 may predict one or more additional frames which were not included in the input data. The frame synthesis neural network 430 may include an error function which can then compare the predicted frame to the provided frame from the set of rendered frames to determine an error.

According to one or more embodiments, similar techniques can be used to train the frame synthesis neural network 430 for temporal or spatial supersampling. That is, the frame synthesis neural network 430 may predict the frames using temporal or spatial supersampling and compare the results to the rendered frames. From there, the frame synthesis neural network may minimize the error between the predicted frames and rendered frames.

Similarly, the frame synthesis neural network 430, or separate network, may be trained to predict a future gaze direction by capturing gaze for a set of rendered frames and using a subset of the captured gaze data as input. The resulting prediction can then be compared against the initial training data to determine an error. By reducing the error, the network can be trained to predict gaze.

FIG. 5 shows, in flowchart form, an example process for supersampling extended reality content, in accordance with one or more embodiments. In particular, FIG. 5 shows an example process for spatial supersampling based on a predicted focus. For purposes of explanation, the following steps will be described in the context of particular components. However, it should be understood that the various actions may be taken by alternate components. In addition, the various actions may be performed in a different order. Further, some actions may be performed simultaneously, and some may not be required, or others may be added, according to various embodiments.

The flowchart 500 begins at block 505, where current body position parameters are determined. Body position parameters may include, for example, pose information (e.g., head pose and/or body pose data). In some embodiments, the body position parameters may include additional data, such as motion data, depth data, or other characteristics of the subject of the pose data which may be used for predicting a future pose of the user for a synthesized frame. In some embodiments, the pose data may include data related to the position and orientation of the tracked subject, for example as represented in the form of 6 degrees of freedom. Other characteristics may be obtained, for example, from visual inertial odometry (VIO) tracking, and/or simultaneous localization mapping (SLAM) tracking techniques. For example, these localization techniques may be concurrently running on the device generating the synthesized frames. As such, the frame synthesis neural network 125 may be trained to consider such localization information when generate synthesized frames. In addition to pose information, gaze information may also be used to generate synthesized frames. Gaze information may include, for example, gaze vector information, pupil location, or the like. Gaze information may be obtained from a gaze tracking pipeline, and may include data collected from gaze tracking sensors, such as cameras facing a user's eye, or other such sensors.

The flowchart continues to block 510, where a future gaze position is predicted based on captured gaze for a set of rendered frames and using a subset of the captured gaze data as input to a network. In some embodiments, the same machine learning network which generates the synthesized frames may be used to predict the future gaze position. Alternatively, the future gaze position may be predicted by a separate network trained to predict gaze position based on the current body position parameters, inverse kinematics data, historic body position data, frame content information, and the like. In some embodiments, the trained network may also predict a pose of the user, such as a head pose, body pose, or the like.

The flowchart 500 continues to block 515, where a gaze region is rendered for a frame at a first resolution based on the predicted gaze position. That is, a portion of a frame which is determined to the target of the predicted gaze will be rendered a particular resolution. In some embodiments, the frame will be rendered using a foveation technique such that target of the predicted gaze is rendered at a higher resolution than the remainder of the frame. For example, moving on to block 520, a peripheral region of the frame may be predicted based on body position, scene geometry data, and one or more prior video frames. The peripheral region may be predicted, for example, by a network trained to generate image data for a peripheral region based on body position, scene geometry data, and one or more prior video frames. For example, the frame synthesis neural network 430 of FIG. 4 can be used to generate the data and can be additionally trained to generate peripheral region image data. In some embodiments, this predicted frame region may be generated at a lower resolution than the gaze region in order to achieve foveation. The flowchart 500 concludes at block 525, where the frame comprised of the gaze region and the peripheral region is provided to drive a display.

Figure 6:
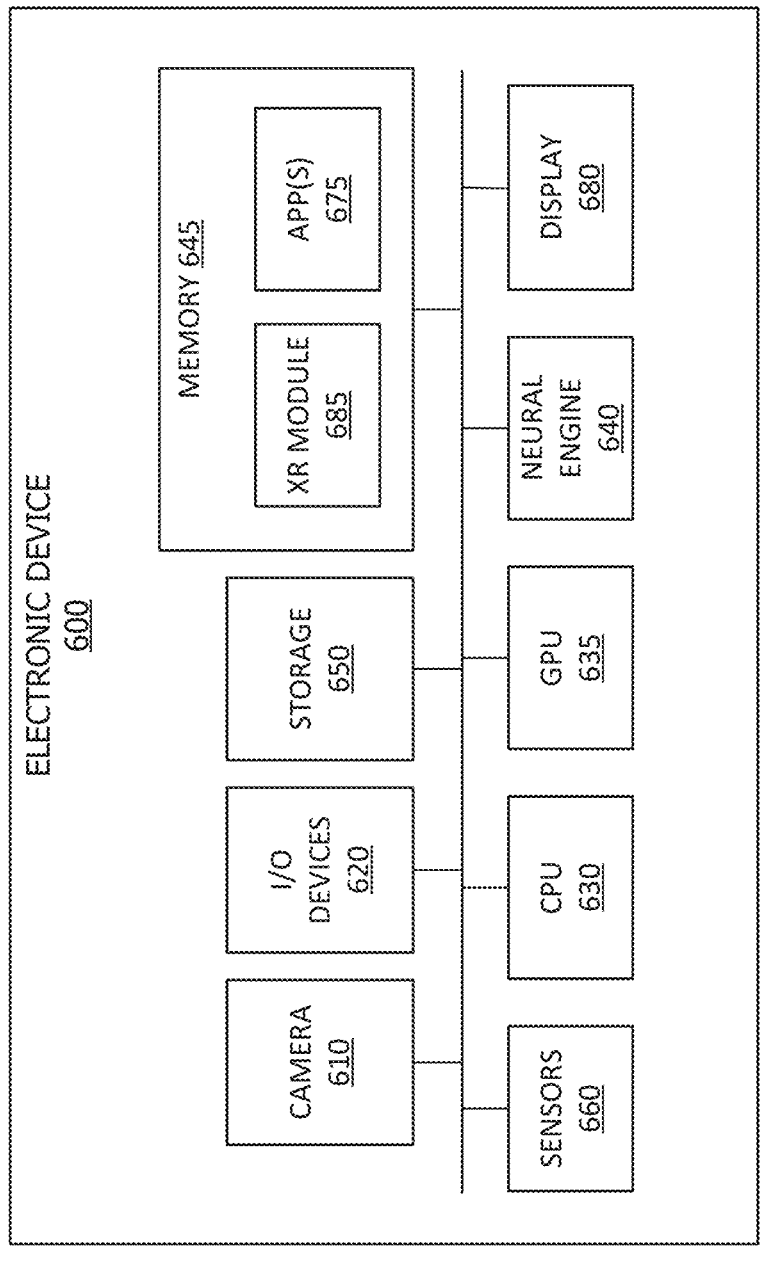
FIG. 6 depicts, in block diagram form, a first view of an example electronic device, according to one or more embodiments.

FIG. 6 depicts a system diagram for an electronic device in which various embodiments of the disclosure may be practiced. Specifically, FIG. 6 depicts an electronic device 600 that is a computer system having XR capabilities.

Electronic device 600 may be part of a multifunctional device, such as a mobile phone, tablet computer, personal digital assistant, portable music/video player, wearable device, head-mounted system, projection-based system, base station, laptop computer, desktop computer, network device, or any other electronic system such as those described herein. Electronic device 600 may be connected to other devices across a network such as accessory electronic devices, mobile devices, tablet devices, desktop devices, or remote sensing devices.

Electronic device 600 may include one or more processors, such as one or more central processing units (CPUs) 630, dedicated graphics processing units (GPUs) 635, or both. Each of the processors may be a system-on-chip, such as those found in mobile devices. Further, processor 630 may include multiple processors of the same or different type. Electronic device 600 may also include a memory 645. Memory 645 may include one or more different types of memory which may be used for performing device functions in conjunction with processors 630 and 635. For example, memory 645 may include cache, ROM, RAM, or any kind of transitory or non-transitory computer-readable storage medium capable of storing computer-readable code. Memory 645 may store various programming modules during execution, such as XR module 685. XR Module 685 may be configured to provide enhance reality services. For example, the XR module 685 may provide functionality to allow a user to interact with virtual objects in the view of a physical environment. Memory 645 also includes additional applications 675. These applications may be used within an XR environment and may provide virtual objects viewable in an XR environment. In some embodiments, the additional applications 675 may be associated with user interface (UI) components. These UI components may allow the user to interact with the applications in the XR environment, for example using I/O devices 620. In some embodiments, the UI components may be presented in the form of virtual content in an image of an environment, and can be displayed within an XR environment among other objects, including other virtual objects and/or physical objects.

Electronic device 600 may also include storage 650. Storage 650 may include one or more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM) and Electrically Erasable Programmable Read-Only Memory (EEPROM). Storage 650 may be utilized to store various data and structures which may be utilized for presenting virtual objects in an XR environment.

In some embodiments, one or more trained networks may be stored in, or accessed by, electronic device 600 to generate one or more synthesized frames. These synthesized frames may be generated by neural engine 640, which may be a specialized processor component configured to process neural networks. As such, the initial frames may be rendered at a low-resolution by GPU 635, and neural engine 640 may generate the supersampled and/or reprojected synthetic frames for presentation on display 680.

Electronic device 600 may include a set of sensors 660. For example, the set of sensors 660 may include one or more image capture sensors, an ambient light sensor, a motion sensor, an eye tracking sensor, and the like. In other implementations, the set of sensors 660 further includes a depth sensor. Similarly, electronic device 600 may include one or more cameras 610. Cameras 610 may include a single camera, one or more stereocamera systems, multi-camera systems, or the like. In some embodiments, cameras 610 are used to provide a view of a physical environment or physical objects within an environment. Cameras 610 may also be used in a user-facing manner to determine gaze direction and the like.

Electronic device 600 may allow a user to interact with XR environments. Many electronic systems enable an individual to interact with and/or sense various XR settings. One example includes head-mounted systems. A head-mounted system may have an opaque display and speaker(s). Alternatively, a head-mounted system may be designed to receive an external display (e.g., a smartphone). The head-mounted system may have imaging sensor(s) and/or microphones for taking images/video and/or capturing audio of the physical setting, respectively. A head-mounted system also may have a transparent or semi-transparent see-through display 680. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one embodiment, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of XR systems include heads-up displays, automotive windshields with the ability to display graphics, windows with the ability to display graphics, lenses with the ability to display graphics, headphones or earphones, speaker arrangements, input mechanisms (e.g., controllers with or without haptic feedback), tablets, smartphones, and desktop or laptop computers.

The various components and functionality of electronic device 600 may additionally or alternatively be distributed across one or more additional devices, such as server devices, base stations, accessory devices, and the like. In addition, the various components and functionality of electronic device 600 may be differently distributed within electronic device 600 according to some embodiments.

Figure 7:
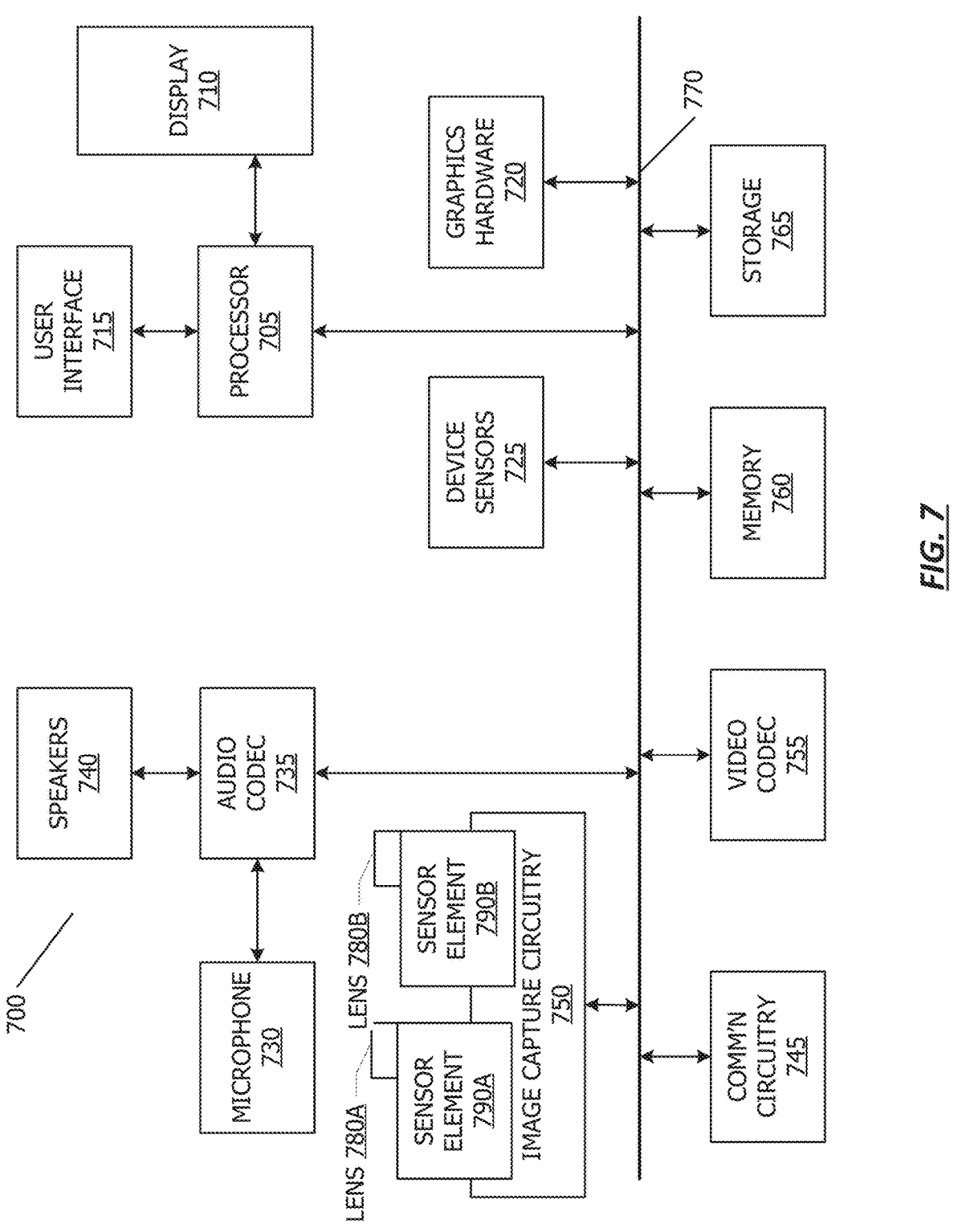
FIG. 7 shows, in block diagram form, a second view of an example electronic device in accordance with one or more embodiments.

Referring now to FIG. 7, a simplified functional block diagram of illustrative multifunction electronic device 700 is shown according to one embodiment. The electronic device may be a multifunctional electronic device or may have some or all of the components of a multifunctional electronic device described herein. Multifunction electronic device 700 may include some combination of processor 705, display 710, user interface 715, graphics hardware 720, device sensors 725 (e.g., proximity sensor/ambient light sensor, accelerometer and/or gyroscope), microphone 730, audio codec 735, speaker(s) 740, communications circuitry 745, digital image capture circuitry 750 (e.g., including camera system), memory 760, storage device 765, and communications bus 770. Multifunction electronic device 700 may be, for example, a mobile telephone, personal music player, wearable device, tablet computer, or the like.

Processor 705 may execute instructions necessary to carry out or control the operation of many functions performed by device 700. Processor 705 may, for instance, drive display 710 and receive user input from user interface 715. User interface 715 may allow a user to interact with device 700. For example, user interface 715 can take a variety of forms, such as a button, keypad, dial, click wheel, keyboard, display screen, touch screen, and the like. Processor 705 may also, for example, be a system-on-chip, such as those found in mobile devices, and include a dedicated GPU. Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 to process graphics information. In one embodiment, graphics hardware 720 may include a programmable GPU.

Image capture circuitry 750 may include one or more lens assemblies, such as lens 780A and 780B. The lens assembly may have a combination of various characteristics, such as differing focal length and the like. For example, lens assembly 780A may have a short focal length relative to the focal length of lens assembly 780B. Each lens assembly may have a separate associated sensor element 790A and 790B. Alternatively, two or more lens assemblies may share a common sensor element. Image capture circuitry 750 may capture still images, video images, enhanced images, and the like. Output from image capture circuitry 750 may be processed, at least in part, by video codec(s) 755, processor 705, graphics hardware 720, and/or a dedicated image processing unit or pipeline incorporated within communications circuitry 745. Images so captured may be stored in memory 760 and/or storage 765.

Memory 760 may include one or more different types of media used by processor 705 and graphics hardware 720 to perform device functions. For example, memory 760 may include memory cache, read-only memory (ROM), and/or random-access memory (RAM). Storage 765 may store media (e.g., audio, image, and video files), computer program instructions or software, preference information, device profile information, and any other suitable data. Storage 765 may include one more non-transitory computer-readable storage mediums, including, for example, magnetic disks (fixed, floppy, and removable) and tape, optical media such as CD-ROMs and DVDs, and semiconductor memory devices such as EPROM and EEPROM. Memory 760 and storage 765 may be used to tangibly retain computer program instructions or computer-readable code organized into one or more modules and written in any desired computer programming language. When executed by, for example, processor 705, such computer program code may implement one or more of the methods described herein.

It is to be understood that the above description is intended to be illustrative and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 2-3 and 5 or the arrangement of elements shown in FIGS. 1, 4, and 6-7 should not be construed as limiting the scope of the disclosed subject matter. The scope of the invention, therefore, should be determined with reference to the appended claims, along with the full scope of equivalents to which such claims are entitled. In the appended claims, the terms "including" and "in which" are used as the plain English equivalents of the respective terms "comprising" and "wherein."

The invention claimed is:

1. A method comprising:

capturing one or more frames of a scene at a first frame rate by one or more cameras of a wearable device;

determining body position parameters in accordance with the one or more frames;

obtaining a 3D geometric representation of at least a portion of the scene in accordance with the one or more frames; and applying the one or more frames, the body position parameters, and the 3D geometric representation of at least the portion of the scene to a trained network to generate one or more additional frames to follow the one or more frames, wherein the trained network is trained based on a rendered set of frames, wherein an error is minimized between a predicted frame and one or more of the rendered set of frames during training based on the one or more frames, the body position parameters, and the 3D geometric representation of at least the portion of the scene.

2. The method of claim 1, wherein the body position parameters include body pose data and gaze data.

3. The method of claim 1, wherein the one or more frames comprises a plurality of frames including a first frame and a second frame, and wherein the trained network further predicts one or more intermediate frames between the first frame and the second frame.

4. The method of claim 3, wherein a frame rate is determined for a set of frames comprising the first frame, the second frame, and the intermediate frames, and wherein the one or more additional frames are predicted in accordance with the determined frame rate.

5. The method of claim 1, wherein the one or more frames are captured from a first viewing frustum, and wherein the one or more additional frames are from one or more additional viewing frustums, wherein the one or more additional viewing frustums are predicted by the trained network.

6. The method of claim 1, wherein the one or more frames are captured at a first resolution, and wherein the trained network predicts the one or more additional frames and a second resolution higher than the first resolution.

7. The method of claim 6, further comprising:

determining virtual content to be rendered in the one or more additional frames; and rendering the virtual content at the second resolution in accordance with the determination.

8. The method of claim 1, wherein the one or more frames, the body position parameters, and the 3D geometric representation are applied to the trained network in accordance with power consumption parameters for the one or more frames or the wearable device.

9. A non-transitory computer readable medium comprising computer readable code executable by one or more processors to:

render one or more frames of a scene;

determine body position parameters in accordance with the one or more frames;

obtain a 3D geometric representation of at least a portion of the scene in accordance with the one or more frames; and apply the one or more frames, the body position parameters, and the 3D geometric representation of at least the portion of the scene to a trained network to generate one or more additional frames to follow the one or more frames, wherein the trained network is trained based on a rendered set of frames, wherein an error is minimized between a predicted frame and one or more of the rendered set of frames during training based on the one or more frames, the body position parameters, and the 3D geometric representation of at least the portion of the scene.

10. The non-transitory computer readable medium of claim 9, wherein the body position parameters include body pose data and gaze data.

11. The non-transitory computer readable medium of claim 9, wherein the one or more frames comprises a plurality of frames including a first frame and a second frame, and wherein the trained network further predicts one or more intermediate frames between the first frame and the second frame.

12. The non-transitory computer readable medium of claim 11, wherein a frame rate is determined for a set of frames comprising the first frame, the second frame, and the intermediate frames, and wherein the one or more additional frames are predicted in accordance with the determined frame rate.

13. The non-transitory computer readable medium of claim 9, wherein the one or more frames are captured from a first viewing frustum, and wherein the one or more additional frames are from one or more additional viewing frustums, wherein the one or more additional viewing frustums are predicted by the trained network.

14. The non-transitory computer readable medium of claim 9, wherein the one or more frames, the body position parameters, and the 3D geometric representation are applied to a trained network in accordance with power consumption parameters for the one or more frames.

15. A system comprising:

one or more processors; and one or more computer readable media comprising computer readable code executable by the one or more processors to:

capture one or more frames of a scene at a first frame rate by one or more cameras of a wearable device;

determine body position parameters in accordance with the one or more frames;

obtain a 3D geometric representation of at least a portion of the scene in accordance with the one or more frames; and apply the one or more frames, the body position parameters, and the 3D geometric representation of at least the portion of the scene to a trained network to generate one or more additional frames to follow the one or more frames, wherein the trained network is trained based on a rendered set of frames, wherein an error is minimized between a predicted frame and one or more of the rendered set of frames during training based on the one or more frames, the body position parameters, and the 3D geometric representation of at least the portion of the scene.

16. The system of claim 15, wherein the one or more frames comprises a plurality of frames including a first frame and a second frame, and wherein the trained network further predicts one or more intermediate frames between the first frame and the second frame.

17. The system of claim 16, wherein a frame rate is determined for a set of frames comprising the first frame, the second frame, and the intermediate frames, and wherein the one or more additional frames are predicted in accordance with the determined frame rate.

* * * * *